United States Patent

[11] 3,594,747

| [72] | Inventor | William R. Cronin<br>Philadelphia, Pa. |
|---|---|---|
| [21] | Appl. No. | 781,938 |
| [22] | Filed | Dec. 6, 1968 |
| [45] | Patented | July 20, 1971 |
| [73] | Assignee | Schulmerich Manufacturing Co.<br>Carillon Hill, Sellersville, Pa. |

[54] CAMERA AND ALARM SURVEILLANCE SYSTEM
24 Claims, 1 Drawing Fig.

[52] U.S. Cl. .................................................. 340/221,
95/12, 109/38, 340/276
[51] Int. Cl. ..............................................G08b 13/00
[50] Field of Search........................................... 340/221,
276; 109/1, 38; 95/12, 11

[56] References Cited
UNITED STATES PATENTS

| 1,891,242 | 12/1932 | Rothman et al. | 340/221 X |
|---|---|---|---|
| 3,117,314 | 1/1964 | Carroll, Jr. et al. | 340/221 X |
| 3,185,056 | 5/1965 | Gold et al. | 340/221 X |
| 3,286,250 | 11/1966 | Teitelbaum | 340/276 |

Primary Examiner—John W. Caldwell
Assistant Examiner—David L. Trafton
Attorney—Smythe and Moore ABSTRACT: A surveillance system for banks and the like wherein a camera is programmed to operate at a normal rate but the rate of operation of the camera may be accelerated by a remote signal in the event of a robbery. An audible alarm is sounded after an adjustable time delay following accelerated operation of the camera. The system may be reset, thereby stopping the sounding of the alarm and returning the camera to a normal rate by a second remote or local signal.

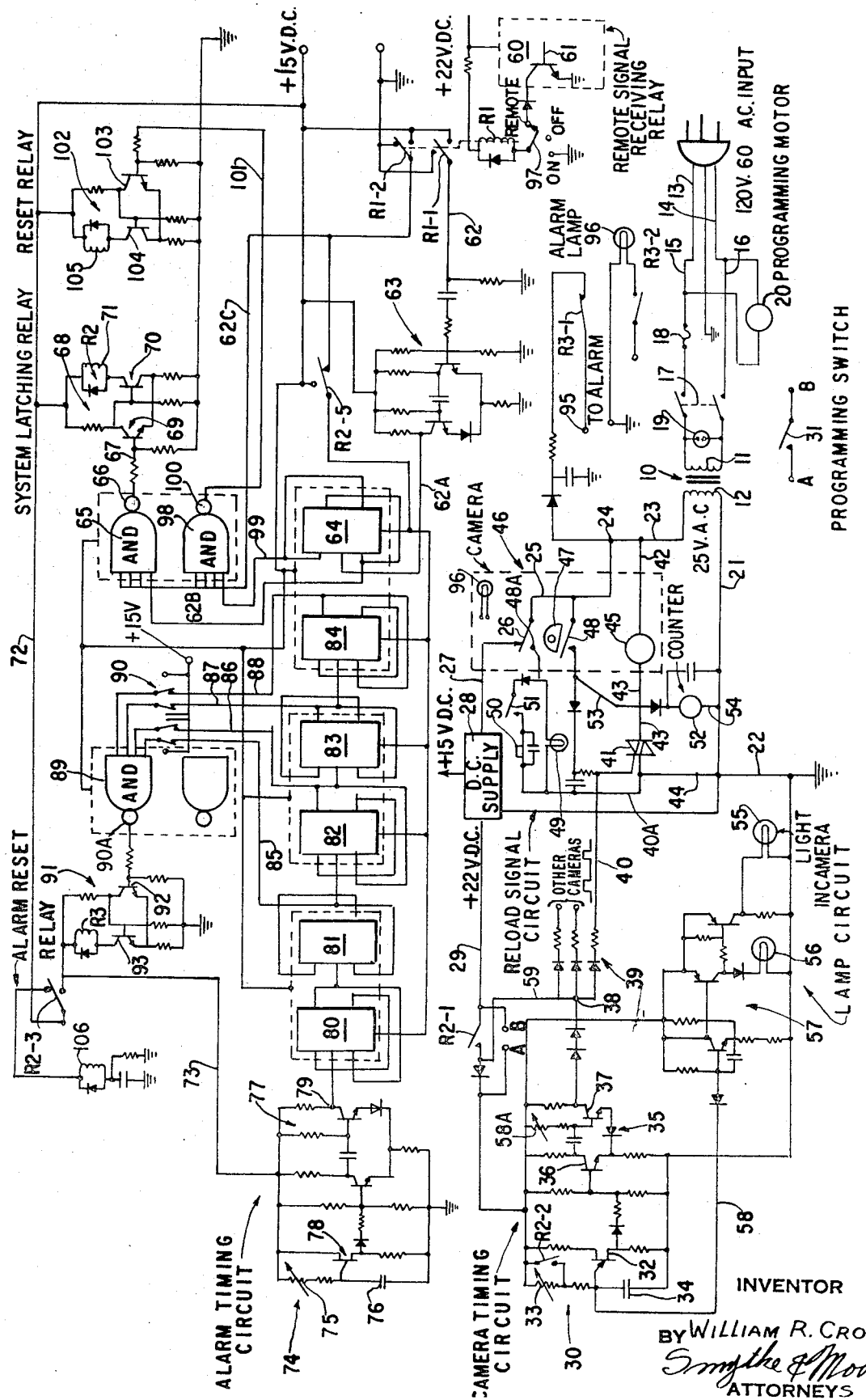

CAMERA AND ALARM SURVEILLANCE SYSTEM

This invention relates to a surveillance system for banks or the like, and more particularly to a camera surveillance and delayed audible alarm system.

Surveillance systems for banks, mercantile establishments, and the like are well known in the art. The present invention differs from such prior devices in that a camera is normally programmed to operate at a given rate for ordinary surveillance, but the rate of operation of the camera is accelerated by one or more remote control signals. Such signals also affect the operation of an audible alarm following an adjustable time delay after accelerated operation of the camera. A second signal, either remote or local, resets the system thereby restoring the camera to normal operation and stopping the alarm.

One of the objects of the invention is to provide a surveillance system in which a camera is programmed to operate at a normal rate but the rate of operation of the camera is accelerated by a remotely transmitted signal.

A further object is the provision of a surveillance system in which an audible alarm is sounded following an adjustable time delay after accelerated operation of the camera.

Another object is the provision of a surveillance system as above described wherein a second signal, remote or local, resets the system.

In one aspect of the invention, an AC source which operates a programming switch is connected to a stepdown transformer which feeds a camera motor and a DC converter. An output from the converter provides for operation through the aforesaid programming switch of a camera timing circuit which operates the camera at a normal rate. Simultaneously, indicating lamps at the camera and a control cabinet show the rate of operation of the camera. a reload switch provides for disconnecting the system and giving a signal when the end of a roll of film is reached. In the event of a robbery, a circuit including a remotely controlled relay, a monostable multivibrator, a flip-flop switch, a logic AND circuit and a latching relay provides for operating the camera at an accelerated rate. Simultaneously, an adjustable delayed alarm system is set into operation, such system including a unijunction fired multivibrator, a flip-flop interval counting system, a manually controlled interval switch, a logic AND circuit, and an alarm relay. A second signal, either remote or locally, on the aforesaid remotely controlled relay stops and resets the system through the above mentioned monostable multivibrator and flip-flop switch, a third logic AND circuit, and resetting relays.

The above and other objects, features and advantages of the invention will be apparent from the following description taken in conjunction with the accompanying drawing.

In the drawing, the sole FIGURE is a schematic wiring diagram illustrating an exemplary embodiment of the camera and alarm system of the present invention.

Referring to the drawings, the power for the system is provided by a transformer 10 having a primary 11 and a secondary 12. The primary 11 is connected to terminals 13 and 14 by lines 15 and 16 having a master switch 17 and a fuse 18 interposed therein. The terminals 13 and 14 are adapted for connection to any suitable source of AC voltage such as a plug connection to a 120 volt, 60 cycle, AC power line. A neon lamp 19 may be connected across the lines 15 and 16 to indicate supply of power to the system. Also connected across the lines 15 and 16 is a programming motor 20 for a purpose hereinafter described.

The lower side of secondary 12, which may produce an AC voltage in the order of 25 volts, for example, is grounded through wires 21 and 22. The hot side of secondary 12 is connected by wire 23 to junction 24 and thence by wire 25 to a camera reload switch 26 which is normally in its upper position to conduct the AC input voltage from secondary 12 to a DC source of supply 28 through conductor 27. The DC supply source 28 may comprise any well known type of converter and provides the +15 and +22 volts for the various parts of the system.

A conductor 29 connects a +22 volt terminal of the DC supply 28 with a camera timing circuit 30. Interposed in the line 29 is a normally opened relay contact switch R2-1 shunted by the terminals A—B which are connected to the terminals A—B of a programming switch 31 operated by the programming motor 20.

The camera timing circuit 30 comprises, in general, a well-known timing circuit in which the firing of a unijunction transistor 32 is controlled by a variable resistance 33 and a capacitor 34, the output of the unijunction transistor controlling a monostable multivibrator 35 which includes transistors 36 and 37 to produce square wave pulses at point 38 of a tri-diode element 39 such element providing for the connection of a plurality of cameras to the surveillance system.

The square wave pulse at point 38 is transmitted by lines 40A to the control element of a solid state switching device 41, such as a triac, which supplies power through lines 42, 43, and 44 to an AC drive element such as the operating motor 45 of a camera indicated by the dashed line 46. The motor 45 operates a cam 47 which closes a holding switch 48 for the motor during a predetermined period of time i.e., for a period long enough to operate the camera through one frame of a picture roll, after which the motor circuit is opened until the next pulse along line 40. Also, an SCR could be used for controlling a DC driving element for the camera (not shown) such as a solenoid.

With further reference to the camera mechanism 46, the reload switch 26 is operated from its upper position to the lower contact 48A at the end of a roll of film in the camera. This in turn operates a reload signal light 49 and, optionally, an audible alarm 50 through a silencing switch 51. The number of frames left on, or used by, a roll of film may also be monitored by a counter 52 connected by lines 53 and 54 to the cam operated switch 48 and the ground connections 21 and 22 whereby the counter is operated once for each picture frame.

The rate at which the camera operates, the rate being accelerated during periods of a robbery as hereinafter described, may be indicated by a lamp 55 positioned at the camera, for example, and a lamp 56 positioned in the control cabinet. A well-known multivibrator circuit 57 triggered by the unijunction transistor 32 through line 58 provides for alternatingly flashing the lamps 55 and 56 in accordance with the pulses delivered by the unijunction transistor 32.

The operation of the surveillance camera system as thus far described is as follows. Upon closing of master switch 17, the system becomes activated to energize the DC supply source 28 and start operation of the programming motor 20. Dependent upon the programming provided by motor 20, the switch contracts 31 of circuit A—B are closed to energize the unijunction timing circuit 30 through line 29. The unijunction transistor fires at a rate of once every 2—5 seconds depending upon the adjustment of variable resistance 33. Upon firing of the unijunction transistor, a square pulse is delivered to device 41 and starts operation of the camera motor 45 and cam 47. The duration of the square pulse, 300 milliseconds, for example, is sufficient to cause closing of holding switch 48 by cam 47 thereby to continue operation of the camera through a predetermined time period, 450 milliseconds, for example whereby the camera is operated through one picture frame.

When the cam 47 has substantially completed one revolution, the switch 48 opens to stop operation of the camera until another pulse is received from the timing circuit. The width of this pulse may be adjusted by the variable resistance 58A connected in the circuit of transistor 37 of multivibrator 35 to assure that the camera motor circuit remains closed until cam 47 closes switch 48. Closing and opening of switch 48 operates the counter 52, and the lamps 55 and 56 blink on and off in accordance with the firing of unijunction transistor 32. The foregoing operation repeats itself with each firing of the unijunction transistor 32 so long as the programming switch contacts A-B are closed, or until reload switch 26 is lowered to contact 48A thereby to open the camera and alarm (hereinafter described) circuits upon reaching the end of a roll of film and to operate indicating lamp 49 and audible signal 50 if silencing switch 51 is closed.

While the foregoing describes the normal operation of the surveillance camera 46, provision is also made for accelerating the rate of operation of the camera and sounding an alarm in the case of a robbery. Such provision includes a remote signal receiving relay 60 adapted to receive discrete signals (specially modulated radio signals, for example) from remote transmitters placed in a cash drawer and/or on the person of a teller. The receiver 60 operates a transistor 61 which connects a relay R1 to a +22 voltage provided by DC supply 28. Relay R1 operates contractors R1-1 and R1-2 from a normally grounded position to a position in which they are connected to a +15 DC voltage from supply source 28. A line 62 connects contactor R1-1 to a monostable or "one shot" multivibrator 63 which triggers a flip-flop switch 64 via line 62A from a reset to set position thereby to render the AND logic circuit 65 operative via lines 62B and 62C to produce an an output signal at terminal 66, zero or low level in this case upon closing of relay contacts R1-1 and R1-2. The output at 66 is connected by line 67 to a latching relay circuit 68, such circuit comprising a normally conducting transistor 69 and a blocking transistor 70 connected in series with the coil 71 of the latching relay R2. The circuit connections are such that relay R2 is operated upon the occurrence of a proper signal from output terminal 66.

Actuation of relay R2 causes closing of contacts R2-1, R2-2 and R2-3 and opening of the contacts R2-4 and R2-5. Closing of the contacts R2-1 connects the +22 volts DC of line 29 directly to the junction 38 through a line 59 and thence to the triac 41 through tri-diode 39 and lines 40 and 40A. The pulse timing circuit 30 is thus bypassed and the motor 45 caused to run continuously thereby to operate the camera 46 at an accelerated rate. The closing of contacts R2-1 also shunts the programming switch contacts A—B in line 29 while the closing of contacts R2-2 shunts the variable resistance 33, thereby effecting accelerated firing of the unijunction transistor 32 irrespective of the programming switch. Such accelerated firing of the unijunction provides an accelerated visual indication, e.g., the lamps 55 and 56 indicate the accelerated operation of the camera.

It should be noted at this point that stoppage or removal of the remote signal to the receiver 60 deactivates relay R1 thereby to deactivate the AND device 65 by again connecting AND 65 to ground via contacts R1-2 and line 62C. The flip-flop 64 and AND 65 are thus conditioned for another operation of relay R1.

Closure of the contacts R2-3 by latching relay R2 connects the +15 volts DC supply via lines 72 and 73 to an alarm timing circuit indicated generally by the reference numeral 74. The timing circuit 74 is shown as comprising an adjustable resistance 75, a capacitor 76 and a unijunction transistor 78 which fires a monostable multivibrator 77 of well-known configuration. The multivibrator 77 provides a square wave output at point 79 which is fed to an interval counter circuit comprising a plurality of flip-flop switches 80, 81, 82, 83 and 84 thereby to provide timing intervals up to 30 times the basic frequency of multivibrator 77. Conductors 85, 86, 87 and 88 connect the switches 81, 82, 83 and 84, respectively, to a logic AND circuit 89 through manually controlled switches 90. The manual switches 90 provide selectively to connect the outputs of flip-flops 81, 82, 83 and 84 or +15 volts DC to AND 89 thereby to vary the timing of the output 90A of AND 89.

The output 90A (in this case low or zero) renders the alarm relay circuit 91 operative by cutting-off transistor 92 and making the transistor 93 conductive to energize relay coil R3. Energization of coil R3 causes relay contacts R3-1 to open, thereby to actuate a normally closed fail-safe outside alarm circuit (not shown) through terminal 95. Simultaneously, the contacts R3-2 are closed to energize the alarm indicating lamp 96 located in the control cabinet.

The accelerated operation of the camera and the sounding of the audible alarm may be stopped, thereby to restore the system to a normal condition, by operation of a manual override switch 97 in the control cabinet or the reception of another remote signal by the receiving relay 60 thereby to reenergize relay R1 and again close contacts R1-1 and R1-2. Closing of the contacts R1-1 reactivates multivibrator 63 to reset the flip-flop switch 64 and apply a +15 volts DC to the input of a third logic AND circuit 98 via a line 99. Simultaneously, the closing of the contacts R1-2 connects +15 volts DC to the other input terminals of logic AND 98 thereby to produce an output signal (low) at terminal 100. Output terminal 100 is connected by a line 101 to a solid-state switching circuit 102 comprising a normally conducting transistor 103 and blocking transistor 104 connected in series with a reset relay coil 105. The low level output signal at terminal 100 turns transistor 103 off, thereby rendering transistor 104 conductive to energize reset relay coil 105. Energization of relay coil 105 unlatches relay R2 thus restoring relay contacts R2-1 through R2-5 and the system to their initial normal condition. The return of contact R2-3 in the alarm circuit to its upper position energizes the alarm relay reset coil 106 thereby to unlatch the alarm relay R3.

While the latching relays R2 and R3 and their resetting coils 105 and 106 are shown as separate items for convenience of illustration, each relay and its resetting coil are actually a single package. In like manner, the flip-flop switches and logic AND circuits are commercially supplied in pairs as indicated by the several rectangular dashed lines.

It will be understood that changes in various details of construction and arrangement of parts may be made without departing from the spirit of the invention except as defined in the appended claims.

What I claim is:

1. In a surveillance system for banks or the like, the combination including a camera, programmed means for operating said camera at a predetermined rate, and means for operating said camera at an accelerated rate.

2. A surveillance system as defined in claim 1 wherein said means for operating said camera at an accelerated rate includes switching means adapted for local or remote operation.

3. A surveillance system as defined in claim 1 wherein said means for operating the camera at a normal rate includes a unijunction fired solid state pulse forming device.

4. A surveillance system as defined in claim 3 wherein circuit means including an indicating lamp is operated by said unijunction.

5. A surveillance system as defined in claim 3 wherein said means for operating the camera at a normal rate includes means for completing operation of the camera through at least one frame of a picture roll following each initiating pulse from said solid-state device.

6. A surveillance system as defined in claim 5 wherein said last named means comprises a cam operated switch.

7. A surveillance system as defined in claim 6 wherein said cam switch operates a frame counter for a picture roll.

8. A surveillance system as defined in claim 5 which further includes means for adjusting the width of said initiating pulses thereby to assure operation of said means for completing a predetermined operation of the camera.

9. A surveillance system as defined in claim 3 wherein said means for operating said camera at an accelerated rate includes means for bypassing said unijunction fired pulse forming device.

10. A surveillance system as defined in claim 3 wherein said means for operating said camera at an accelerated rate includes means for firing said unijunction at an accelerated rate thereby operating said indicating lamp at an accelerated rate.

11. A surveillance system as defined in claim 1 which further includes means operated by said camera for indicating the end of a film roll and discontinuing operation of the camera.

12. A surveillance system as defined in claim 11 wherein operation of said camera is controlled by an AC-DC converter means, and discontinuance of the operation of said camera is effected by deenergizing said converter means.

13. A surveillance system as defined in claim 3 which further includes means for adjusting the normal firing rate of said unijunction thereby to control the normal operating rate of said camera.

14. A surveillance system as defined in claim 1 which further includes an alarm means, and circuit means for operating said alarm means a predetermined time after accelerated operation of said camera.

15. In a surveillance system for banks or the like, the combination which includes a camera, an alarm, first circuit means including a remotely operated switching means for effecting a predetermined operation of said camera, and second circuit means initiated by operation of said remotely operated switching means for effecting operation of said alarm a predetermined time after actuation of said camera.

16. A surveillance system as defined in claim 15 in which said second circuit means includes means for adjustably delaying operating of the alarm.

17. A surveillance system as defined in claim 16 in which said alarm circuit means includes a pulse forming timing circuit means.

18. In a surveillance system for banks or the like, the combination which includes a camera, an alarm, first circuit means including a remotely operated switching means for effecting a predetermined operation of said camera, and second circuit means initiated by operation of said remotely operated switching means for effecting operation of said alarm a predetermined time after actuation of said camera, said second circuit means includes means for adjustably delaying operating of the alarm and pulse forming timing circuit means connected with counter means including a plurality of flip-flop switches.

19. A surveillance system as defined in claim 18 which further includes a DC source of power and a manually operated switching means having outputs from said counter switching means, and said manually operated switching means provides for selectively connecting said outputs or said DC source into said alarm circuit means.

20. In a surveillance system for banks or the like, the combination which includes a camera, an alarm, first circuit means including a remotely operated switching means for effecting a predetermined operation of said camera, said first circuit including a latching relay means, and second circuit means initiated by operation of said remotely operated switching means for affecting operation of said alarm a predetermined time after actuation of said camera.

21. A surveillance system as defined in claim 20 in which a second relay means provides for unlatching and resetting of said first relay means, said second relay means being operative upon reception of a second resetting signal by said remotely operated switching means or a locally positioned overriding switching means.

22. A surveillance system as defined in claim 21 in which said camera operating circuit means includes a one-shot pulse producing circuit means, and a solid-state circuit means operated by said impulse provides for effecting operation of said latching relay means.

23. A surveillance system as defined in claim 22 wherein said resetting means includes said pulse producing and said solid-state means.

24. A surveillance system as defined in claim 21 wherein said alarm circuit means includes a latching relay and an unlatching reset relay operative upon reception of said resetting signal.

UNITED STATES PATENT OFFICE
CERTIFICATE OF CORRECTION

Patent No. 3,594,747　　　　　　　　　Dated July 20, 1971

Inventor(s) William R. Cronin

It is certified that error appears in the above-identified patent and that said Letters Patent are hereby corrected as shown below:

Column 1, line 5, insert --a-- after "and"; Column 2, line 16, insert --40 and-- after "lines"; Column 2, line 51, "contracts" should be --contacts--; Column 3, line 12, "contractors" should be --contactors--.

Signed and sealed this 29th day of February 1972.

(SEAL)
Attest:

EDWARD M. FLETCHER, JR.　　　　ROBERT GOTTSCHALK
Attesting Officer　　　　　　　　Commissioner of Patents